(12) United States Patent
Rubin (10) Patent No.: US 10,591,909 B2
(45) Date of Patent: Mar. 17, 2020

(54) HANDHELD MOBILE DEVICE FOR ADAPTIVE VEHICULAR OPERATIONS

(71) Applicant: Essential Products, Inc., Palo Alto, CA (US)

(72) Inventor: Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 9 days.

(21) Appl. No.: 15/923,486

(22) Filed: Mar. 16, 2018

(65) Prior Publication Data

US 2018/0267527 A1    Sep. 20, 2018

Related U.S. Application Data

(60) Provisional application No. 62/473,136, filed on Mar. 17, 2017.

(51) Int. Cl.
*B60W 10/18* (2012.01)
*G05D 1/00* (2006.01)
(Continued)

(52) U.S. Cl.
CPC .......... *G05D 1/0016* (2013.01); *B60W 10/04* (2013.01); *B60W 10/18* (2013.01); *B60W 10/20* (2013.01);
(Continued)

(58) Field of Classification Search
CPC ...... B60W 10/04; B60W 10/18; B60W 10/20; B60W 30/06; B60W 30/12; B60W 30/14; B60W 50/14; B60W 2050/146; B60W 2540/04; B60W 2550/12; B60W 2550/20; B60W 2550/40; B60W 2710/09; B60W 2710/18; G05D 1/0016; G05D 1/0022; G05D 1/0276; G08G 1/096725;
(Continued)

(56) References Cited

U.S. PATENT DOCUMENTS 9,223,134 B2 * 12/2015 Miller ................ G02B 27/0093
9,285,589 B2 *  3/2016 Osterhout ............ G02B 27/017
(Continued)

OTHER PUBLICATIONS

Buderath et al., The operational impact to the maintainer (Ground Crew Support and human factors), 2008, IEEE, pp. 1-19 (Year: 2008).*

(Continued)

*Primary Examiner* — Mcdieunel Marc
(74) *Attorney, Agent, or Firm* — Perkins Coie LLP (57) ABSTRACT

The embodiments include a handheld mobile device (HMD) operable to cause a subsystem of a vehicle to perform a vehicular operation associated with an existing capability of the subsystem. The HMD includes a processor, a port operable to communicatively couple the HMD to an existing on-board computer of a vehicle via an existing data link connector of the vehicle, and a wireless interface operable to communicatively couple the HMD to at least one of the vehicle or a remote service. The HMD further includes a memory storing a software application that, when executed by the processor, causes the HMD to communicate a command to the on-board computer via the data link connector to perform the vehicular operation associated with the existing capability of the subsystem.

19 Claims, 5 Drawing Sheets

(51) Int. Cl.
*G05D 1/02* (2020.01)
*G07C 5/00* (2006.01)
*B60W 10/04* (2006.01)
*B60W 10/20* (2006.01)
*B60W 30/06* (2006.01)
*B60W 30/12* (2020.01)
*B60W 30/14* (2006.01)
*B60W 50/14* (2020.01)
*G08G 1/16* (2006.01)
*G08G 1/0967* (2006.01)
*H04W 4/02* (2018.01)
*H04W 4/48* (2018.01)
*G07C 5/08* (2006.01)

(52) U.S. Cl.
CPC ............ *B60W 30/06* (2013.01); *B60W 30/12* (2013.01); *B60W 30/14* (2013.01); *B60W 50/14* (2013.01); *G05D 1/0022* (2013.01); *G05D 1/0276* (2013.01); *G07C 5/008* (2013.01); *G08G 1/09675* (2013.01); *G08G 1/096725* (2013.01); *G08G 1/096741* (2013.01); *G08G 1/096775* (2013.01); *G08G 1/167* (2013.01); *G08G 1/168* (2013.01); *H04W 4/02* (2013.01); *H04W 4/025* (2013.01); *H04W 4/48* (2018.02); *B60W 2050/146* (2013.01); *B60W 2540/04* (2013.01); *B60W 2550/12* (2013.01); *B60W 2550/20* (2013.01); *B60W 2550/40* (2013.01); *B60W 2710/09* (2013.01); *B60W 2710/18* (2013.01); *B60W 2710/20* (2013.01); *G05D 2201/0213* (2013.01); *G07C 5/0816* (2013.01); *G07C 2205/02* (2013.01)

(58) Field of Classification Search
CPC ......... G08G 1/096741; G08G 1/09675; G08G 1/096775; G08G 1/167; G08G 1/168; H04W 4/48; H04W 4/02; H04W 4/025; G07C 5/008; G07C 5/0816; G07C 2205/02
See application file for complete search history.

(56) References Cited

U.S. PATENT DOCUMENTS

| | | | | |
|---|---|---|---|---|
| 9,366,862 | B2* | 6/2016 | Haddick | G02B 27/0093 |
| 9,759,917 | B2* | 9/2017 | Osterhout | G02B 27/0093 |
| 10,180,572 | B2* | 1/2019 | Osterhout | G02B 27/0093 |
| 2015/0234186 | A1* | 8/2015 | Meadows | G02B 27/017 345/8 |
| 2017/0337573 | A1* | 11/2017 | Toprak | G06Q 30/0202 |

OTHER PUBLICATIONS

Mahfoud et al., Next Generation Vehicle Network: Web Enabled, 2008, IEEE, pp. 1-7 (Year: 2008).*
Carr et al., A wearable computer for support of astronaut extravehicular activity, 2002, IEEE, pp. 1-8 (Year: 2002).*
Gu et al., SWICOM: An SDR-Based Wireless Communication Gateway for Vehicles, 2010, IEEE, pp. 1-13 (Year: 2010).*
Kelber et al., Electrical Drives in Intelligent Vehicles: Basis for Active Driver Assistance Systems, 2005, IEEE, pp. 1623-1628 (Year: 2005).*
Oetiker et al., A Navigation-Field-Based Semi-Autonomous Nonholonomic Vehicle-Parking Assistant, 2008, IEEE, pp. 1106-1118 (Year: 2008).*
Shaout et al., Advanced Driver Assistance Systems—Past, present and future, 2011, IEEE, pp. 72-82 (Year: 2011).*
An et al., Automatic Valet Parking System incorporating a nomadic device and parking servers, 2011, IEEE, pp. 111-112 (Year: 2011).*

* cited by examiner

HANDHELD MOBILE DEVICE FOR ADAPTIVE VEHICULAR OPERATIONS

CROSS-REFERENCE TO RELATED APPLICATION(S)

This application claims priority to U.S. Provisional Patent Application No. 62/473,136 filed on Mar. 17, 2017, entitled "DRIVER ASSIST AND AUTONOMOUS VEHICLE OPERATION," which is hereby incorporated by reference in its entirety.

TECHNICAL FIELD

The disclosed teachings relate to retrofitting a vehicle for adaptive vehicular operations. More particularly, the disclosed teachings relate to a handheld mobile device that can plug into a standard port of a vehicle and run an application that processes vehicular-related information to cause vehicular operations of the vehicle.

BACKGROUND

Figure 1:
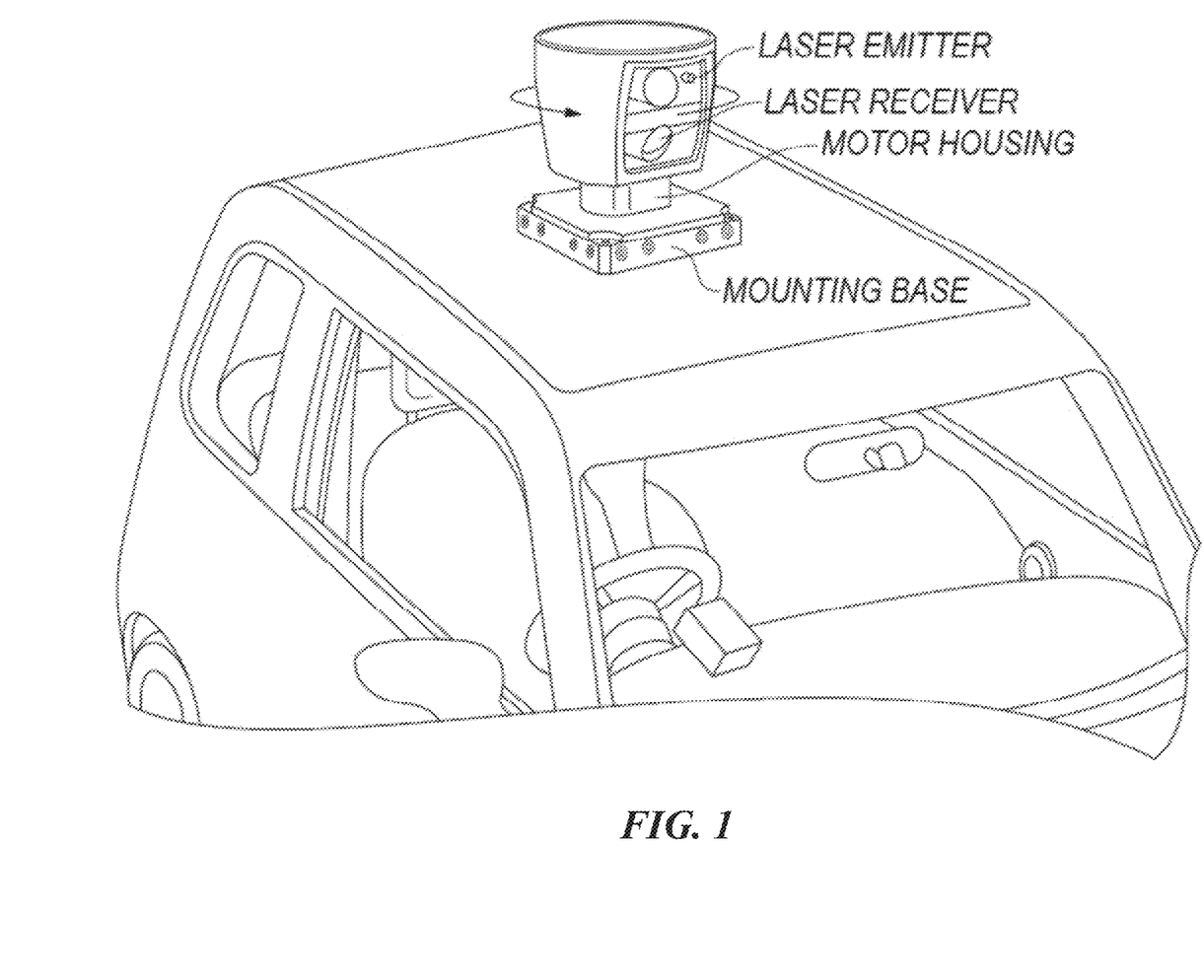
FIG. 1 is an illustration that depicts a light detection and ranging (LiDAR) device mounted on the roof of a vehicle.

A semi-autonomous vehicle can assume certain tasks that are otherwise performed by a human driver or can assist the human driver to adapt to real-time conditions. An autonomous vehicle (i.e., driverless, self-driving, robotic) is a vehicle that can sense its environment and navigate without assistance from a human driver. For example, a typical autonomous vehicle uses a spinning range finding unit such as a light detection and ranging (LiDAR) device mounted on the roof of a vehicle. FIG. 1 illustrates a conventional LiDAR device mounted atop the roof of an autonomous vehicle. In operation, the LiDAR device scans its surroundings and creates a detailed map of the vehicle's environment as the vehicle moves in the environment.

Driver-assistance or autonomous driving systems includes software that processes the information obtained from the specialized equipment to provide human driver assisted or autonomous vehicular operations. Such systems can adapt to help navigate the vehicle. Unfortunately, existing technology that enables at least some autonomous vehicular operations lack broad consumer appeal because their implementation requires retrofitting a vehicle with specialized, cost-prohibitive, and awkwardly bulky equipment.

SUMMARY

The disclosed embodiments include a handheld mobile device (HMD) (e.g., smartphone) operable to cause a subsystem of a vehicle to perform a vehicular operation associated with an existing capability of the subsystem. The HMD includes a processor, a port operable to (e.g., bi-directionally) communicatively couple the HMD to an existing on-board computer of a vehicle via an existing data link connector (e.g., on-board diagnostics (OBD) connector) of the vehicle, and a wireless interface operable to communicatively couple the HMD to the vehicle or a remote service. The HMD further includes a memory storing a software application that, when executed by the processor, causes the HMD to communicate a command to the on-board computer via the data link connector to perform the vehicular operation associated with the existing capability of the subsystem.

In some embodiments, the vehicular operation is a semi-autonomous driving operation configured to assist a human driver of the vehicle to navigate the vehicle. For example, in some embodiments, the vehicular operation is a notification configured to assist a human driver with navigation of the vehicle. The notification is rendered by an output device of the vehicle or an output device of the HMD. In some embodiments, the vehicular operation is an autonomous driving operation causing the vehicle to perform a driving operation independent of any human driver of the vehicle.

In some embodiments, the vehicular operation is activating or deactivating a feature of an existing capability of a subsystem. In some embodiments, the vehicular operation is a modification to an operation of an existing capability of a subsystem. In some embodiments, the HMD is operable to receive input from a human driver of a vehicle to control a setting of the vehicular operation.

In some embodiments, the subsystem is any of a powertrain subsystem, a braking subsystem, a steering subsystem, an electronics subsystem, or a control subsystem. In some embodiments, the subsystem is any of an adaptive cruise control subsystem, a parking assistance with automated steering subsystem, or a lane keeping assistance subsystem.

In some embodiments, the executed instructions cause the HMD device to obtain vehicular information of the vehicle via the data link connector such that the vehicular command is based on the obtained vehicular information. In some embodiments, the executed instructions cause the HMD device to obtain vehicular sensor information of the vehicle such that the vehicular command is based on the obtained vehicular sensor information. In some embodiments, the executed instructions cause the HMD device to obtain location information, road condition information, weather information, and/or vehicular traffic information from remote service(s) that provides such that the vehicular command is based on the obtained location information, road condition information, weather information, or vehicular traffic.

In some embodiments, the executed instructions cause the HMD device to cause an interface of an existing console of the vehicle to display outputs or receive inputs associated with the vehicular operation.

In some embodiments, the wireless interface is operable to communicatively couple the HMD to a remote service or to the vehicle over at least one of a cellular link, a Wi-Fi link, or a short-range radio link. In some embodiments, the HMD's port is operable to receive power from a power source of the vehicle via the data link connector.

The disclosed embodiments also include a system operable to cause a subsystem of a vehicle to perform a vehicular operation associated with an existing capability of the subsystem. The system includes a smartphone with a processor, a memory, a port operable to perform bi-directional communications of vehicular information by coupling the HMD to an on-board diagnostics (OBD) connector, and a wireless interface operable to receive at least one of location information, road condition information, weather information, or vehicular traffic information from one or more remote services. The system further includes a software application stored on the memory that, when executed by the processor, causes the HMD device to determine a vehicular operation based on vehicular information received via the OBD connector and any of location information, road condition information, weather information, or vehicular traffic information received via the wireless interface, communicate the vehicular command to the on-board computer via the OBD connector to perform the vehicular operation by modifying an operation of an existing capability of an adaptive cruise control subsystem, a parking assistance with automated steering subsystem, or a lane keeping assistance subsystem.

The disclosed embodiments also include a method performed by a smartphone to cause a vehicular operation associated with an existing capability of a vehicle. The method includes receiving, via an on-board diagnostics (OBD) connector, vehicular information collected by an on-board computer of the vehicle; receiving any of location information, road condition information, weather information, or vehicular traffic information over a wireless link; and/or receiving vehicular sensor information. The method also includes determining a vehicular operation based on any of the received vehicular information, the vehicular sensor information, and the received location information, road condition information, weather information, or vehicular traffic information. The method further includes communicating, via the OBD connector, a vehicular command to the on-board computer to perform the vehicular operation by modifying an operation of an existing capability of an adaptive cruise control subsystem, a parking assistance with automated steering subsystem, or a lane keeping assistance subsystem.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other aspects of the disclosed embodiments will be apparent from the accompanying Figures and Detailed Description.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Semi-Autonomous (Driver-Assist) Vehicles

An advanced driver assistance system (ADAS) is a system developed to automate, adapt, and/or enhance vehicle systems for safety and to improve driving. For example, safety features are designed to help a human driver of a vehicle avoid collisions and accidents by offering technologies that alert the human driver to potential problems. In some instances, the ADAS can avoid collisions by implementing safeguards that involve taking control over the vehicle. In some instances, the ADAS offers adaptive features that may automate lighting, provide adaptive cruise control, automate braking, incorporate GPS or traffic warnings, connect to smartphones, alert a human driver of other cars or dangers, keep the human driver in a correct lane, or show what is in blind spots.

There are many forms of ADAS available. Some features of an ADAS can be built into cars or made available as an add-on package. In addition, aftermarket solutions may be available. ADAS relies on inputs from multiple data sources, including automotive imaging, LiDAR, radar, image processing, computer vision, and in-car networking. Additional inputs are possible from other sources separate from the primary vehicle platform, such as other vehicles (i.e., vehicle-to-vehicle (V2V) communications), or vehicle-to-infrastructure systems (e.g., mobile telephony or Wi-Fi data network).

Driver assistance systems are one of the fastest-growing segments in automotive electronics, with steadily increasing rates of adoption of industry-wide quality standards, in vehicular safety systems ISO 26262, developing technology specific standards such as IEEE 2020 for image sensor quality, and communications protocols such as a vehicle information application programming interface (API).

Autonomous Vehicles

An autonomous vehicle (i.e., driverless, self-driving, robotic) can sense its environment and navigate without human input. Many such vehicles are being developed, but as of February 2017 automated cars permitted on public roads are not yet fully autonomous. They all require a human driver at the wheel who is ready at a moment's notice to take control of the vehicle.

Autonomous vehicles can use a variety of techniques to detect their surroundings, such as radar, laser light, GPS, odometry, and computer vision. Advanced control systems may interpret sensory information to identify appropriate navigation paths, as well as obstacles and relevant signage. Autonomous vehicles can have control systems that are capable of analyzing sensory data to distinguish between different cars on a road, which could be required to determine a navigation path to the desired destination.

SAE International published a classification system in 2014 that has six different levels ranging from none to fully automated systems. SAE International is an automotive standardization body, and the associated publication J3016 is entitled Taxonomy and Definitions for Terms Related to On-Road Motor Vehicle Automated Driving Systems. This classification system is based on the amount of required driver intervention and attentiveness rather than the vehicle capabilities, although these are closely related. In the United States in 2013, the National Highway Traffic Safety Administration (NHTSA) released a formal classification system, but abandoned this system when it adopted the SAE standard in September 2016.

A brief description of the SAE automated vehicle classifications follows. Level 0 covers a system that may issue warnings but offers no vehicle control.

Level 1 covers a system where a human driver must be ready to take control of a vehicle at any time. An automated system may include features such as adaptive cruise control (ACC), parking assistance with automated steering, and lane keeping assistance (LKA) Type II in any combination.

Level 2 covers a system where a human driver is obliged to detect objects and events, and respond if the automated system fails to respond properly. An automated system can execute accelerating, braking, and steering of a vehicle. The automated system can deactivate immediately upon takeover by the human driver.

Level 3 covers a system that within known, limited environments, such as freeways, a human driver of a vehicle that implements such a system can safely turn their attention away from driving tasks but must still be prepared to take control when needed.

Level 4 covers an automated system that can control the vehicle in all but a few environments, such as severe weather. A human driver must enable the automated system only when it is safe to do so. When enabled, human driver attention is not required.

Level 5 covers a system where no human intervention is required other than setting the destination and starting the system. The automatic system can drive to any location where it is legal to drive and make its own decisions.

Modern self-driving vehicles generally use Bayesian simultaneous localization and mapping (SLAM) algorithms, which fuse data from multiple sensors and an offline map into current location estimates and map updates. SLAM with detection and tracking of moving object (DATMO) is a variant which also handles detection and tracking of other moving objects, such as vehicles and pedestrians. Simpler systems may use roadside real-time locating system (RTLS) beacon systems to aid localization. Typical sensors include LiDAR and stereo vision, global positioning system (GPS), and internal measurement unit (IMU) technologies. Visual object recognition typically uses machine vision including neural networks.

In both semi-autonomous and autonomous driving, vehicle manufacturers, subject to often burdensome regulatory scrutiny, build features into their vehicles to implement such technologies and, in the near future, autonomous functionality. However, the vast number of vehicles currently on the road cannot take advantage of such functionality as it currently exists and as improvements become available. Further, even if automobile manufacturers would offer to retrofit existing vehicles with driver assistance or autonomous features, the regulatory and legal liability issues attendant with activities would present an insurmountable task to implementation thereof.

The disclosed embodiments overcome many of the foregoing drawbacks. It will be appreciated that specific embodiments are described herein for purposes of illustration, but that various modifications may be made without deviating from the scope of the invention. Accordingly, the disclosed embodiments are not limited except as by the appended claims.

Implementing Driver Assist and Autonomous Vehicle Operations in a Vehicle

The disclosed embodiments relate to a system including a handheld mobile device (e.g., smartphone) that can plug into a standard port of a vehicle, and can run an application ("app") to obtain or process information about vehicular-related information (e.g., driving conditions). The information can be used to control the way that the vehicle navigates. For example, the smartphone's app can cause the vehicle to brake, accelerate, or change lanes instantaneously based on real-time driving conditions.

More particularly, the disclosed embodiments concern implementation of driver assistance and autonomous vehicle operations by adapting readily-available consumer devices to control vehicle operations. Such embodiments can do away with awkward and cost-prohibitive, specialized equipment that requires complex retrofitting of a host vehicle. Instead, the disclosed technology enables retrofitting of existing vehicles with driver assistance or autonomous features while avoiding the burdensome requirements of current technologies. The disclosed embodiments thus include an architecture for providing existing vehicles with driver assistance and/or autonomous features with an app-based integration of various sensors with a vehicle interface which, in some embodiments, can be the industry standard on-board diagnostics (OBD) data link connector.

An OBD data link connector refers to a port that accesses a vehicle's self-diagnostic and reporting capability. OBD systems give a vehicle owner or repair technician access to status or other information about vehicle subsystems. The amount of information available via OBD can vary. Early versions of OBD systems could illuminate a malfunction indicator light if a problem was detected but would not provide any information as to the nature of the problem. Modern OBD system implementations can use a standardized digital communications port to provide real-time data in addition to a standardized series of diagnostic trouble codes (DTCs), which allow one to rapidly identify and remedy malfunctions within the vehicle. OBD-II diagnostic trouble codes are 4-digit, preceded by a letter: P for engine and transmission (powertrain), B for body, C for chassis, and U for network.

Although OBD standardization was prompted to simplify diagnosis of increasingly complicated emissions equipment, an OBD connector may be the main connector in a vehicle through which all systems are diagnosed and reprogrammed. Moreover, manufacturers can add data parameters to customized OBD implementations, including real-time data requests as well as trouble codes.

The OBD standard (e.g., OBD-II) may specify a type of connector and its pinout, available electrical signaling protocols, and a messaging format that can be employed by an HMD handheld mobile device to communicate with a vehicle's on-board computers. For example, an OBD connector may include a pin to power an HMD that is communicatively coupled to the on-board computer(s) via the OBD connector. In some embodiments, an HMD could be powered by a power source other than via the OBD connector. In another example, an OBD may provide a standard list of vehicle parameters that can be monitored along with how to encode data for each. Hence, an OBD connector can provide a standardized interface between an HMD and any vehicle's on-board computer(s). Further, due to standardized features, an HMD can communicatively couple with on-board computer(s) of most any vehicle that has an OBD connector to communicate parameters with on-board computer(s). As a result of this standardization, a single device can query the on-board computer for these parameters in any vehicle.

The SAE J1962 specification provides for two standardized hardware interfaces, called type A and type B. Both are female, 16-pin (2×8), D-shaped connectors, and both have a groove between two rows of pins. The type A connector is used for vehicles that use 12V supply voltage, whereas type B is used for 24V vehicles and it is required to mark the front of the D-shaped area in blue color.

Mode of Operation

There are nine modes of operation in current standards. Mode $08 enables the off-board test device to control the operation of an on-board system, test, or component. While most modes are simply used to extract information from a vehicle's computer, Mode $08 is different. Mode 8 allows bi-directional communication between the scan tool itself and the vehicle, thus allowing the tool to give commands to the vehicle. This mode is one of the most effective for changing settings and parameters on a vehicle's on-board computer. It can be used for a wide range of functions. For example, Mode 8 can tell the vehicle's computer to disable components, and can even make adjustments to sensors.

Mode 8: Bi-Directional Communication

Mode 8 allows the scan tool to run multiple self-tests by sending commands to a powertrain control module, or PCM. The function also allows the scan tool to control on-board system or components.

There are many uses for Mode 8. For example, a vehicle may have an obvious fuel system issue. By using Mode 8, a technician can test multiple parts in an attempt to find the problem. The technician uses Mode 8 to tell the fuel pump to engage. If the fuel pump runs, the technician can move on to another component. If, however, the fuel pump doesn't engage, the cause of the issue has been found.

System Architecture

Figure 2:
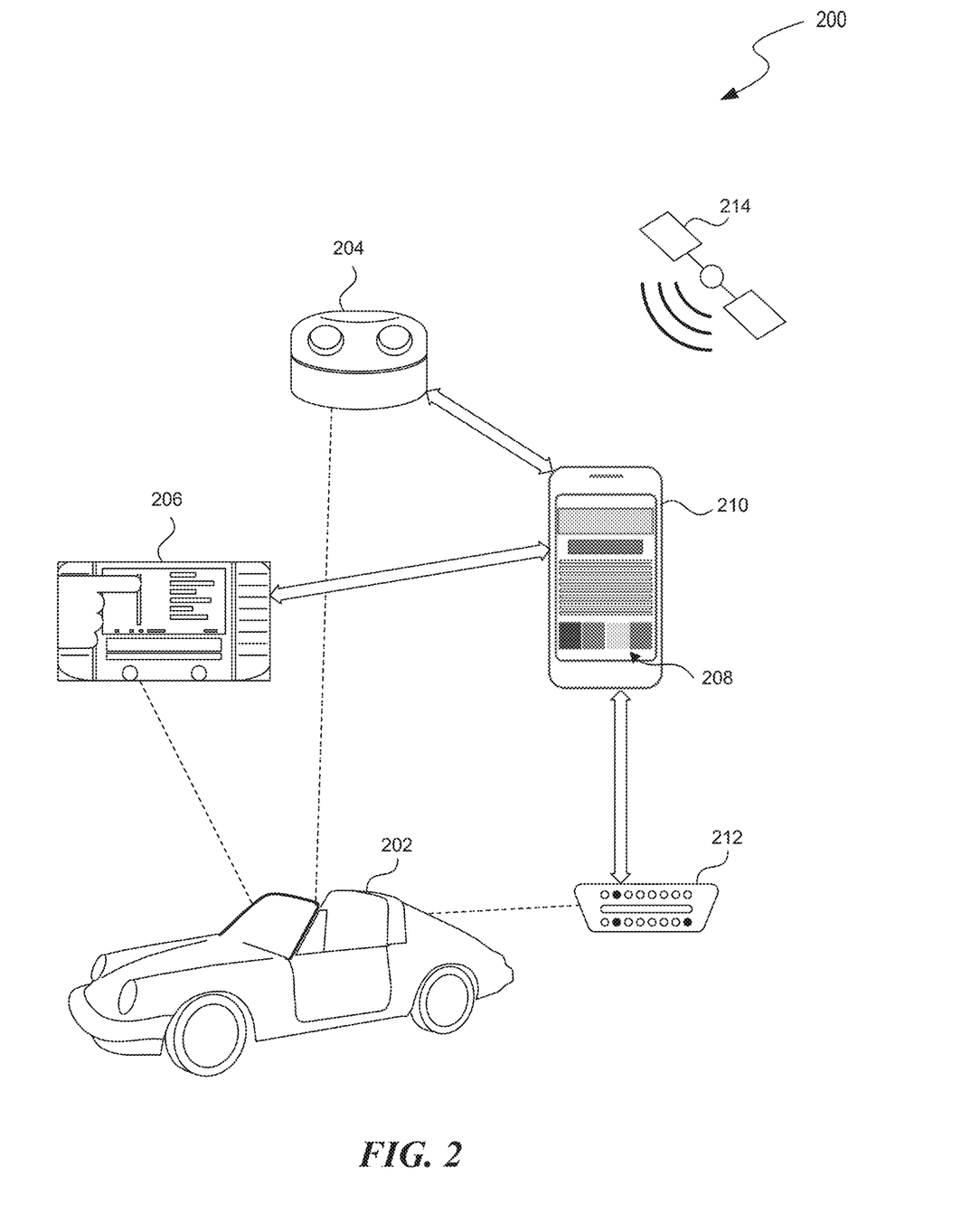
FIG. 2 is a block diagram illustrating an architecture for implementing at least semi-autonomous vehicular operations with app-based integration of locally and/or remotely sourced vehicular-related information.

FIG. 2 is a block diagram illustrating an architecture for implementing semi-autonomous or fully autonomous vehicle navigation features with app-based integration of sensors and a vehicle's on-board computer(s) according to some embodiments of the present disclosure. In some embodiments, the app-based integration is achieved through a vehicle interface such as a standard on-board diagnostics (OBD) port.

As shown, architecture 200 includes a vehicle 202 such as a passenger automobile, truck, boat, or any other vehicle that has a data link connector through which an HMD (e.g., smartphone) can communicatively couple to the vehicle's on-board computer(s). For example, an OBD connector 204 can allow access to various systems and subsystems of the vehicle 202. The vehicle 202 also typically includes a console 206 that, in most modern vehicles, includes functions accessible through a user interface. Examples of the functions include BLUETOOTH, a touch screen, and the like.

The disclosed embodiments include a software application ("app") 208 running on an HMD such as a smartphone 208, smartwatch, etc. In some embodiments, the architecture 200 can include other processor-implemented functionality that can engage in bi-directional communications with the vehicle's on-board computer(s) via BLUETOOTH, Wi-Fi, 3G, or any other wireless or wired (e.g., via cable) communications. Thus, the app 208 running on the smartphone 210 can exchange information with the console 206 and with the vehicle's on-board computer(s) via the OBD connector 204.

The app 208 can also communicatively connect to one or more sensors 212 associated with the vehicle 202. Examples of the sensors 212 include a LiDAR sensor array that can provide situational awareness with regard to the vehicle. Further, the app 208 can access underlying functionality of a processor and other functionality within the ambit of the processor. In the context of the smartphone 210, this functionality includes access to geolocation information such as that provided by a GPS system 214, as well as cell tower and other information (not shown). Therefore, the smartphone 208 can run the app 208 that can provide a user interface (UI) to the human driver either via the console 206 or directly from a touch-sensitive screen of the smartphone 208 on which the app 208 is executed.

In some embodiments, the app 208 includes various program sequences that, in response to user input, cause the smartphone 210 to receive sensor information, receive geolocation information, determine the vehicle 202's location, speed, identify driving hazards, etc. The app 208 may also receive information about the vehicle 202 from the OBD connector 204. Examples of this information includes speed, acceleration, braking, etc. Based on this information, the app 208 can generate both display signals for the console 206 and control signals for the vehicle 202. For example, if driver assist functions are implemented by the app 208 running on the smartphone 210, then the app 208 may cause the vehicle 202, via the OBD connector 204, to apply brakes, accelerate, alert the human driver to change lanes, etc. Further, the app 208 may also cause the vehicle 202 to steer autonomously under control of the app 208.

Figure 3:
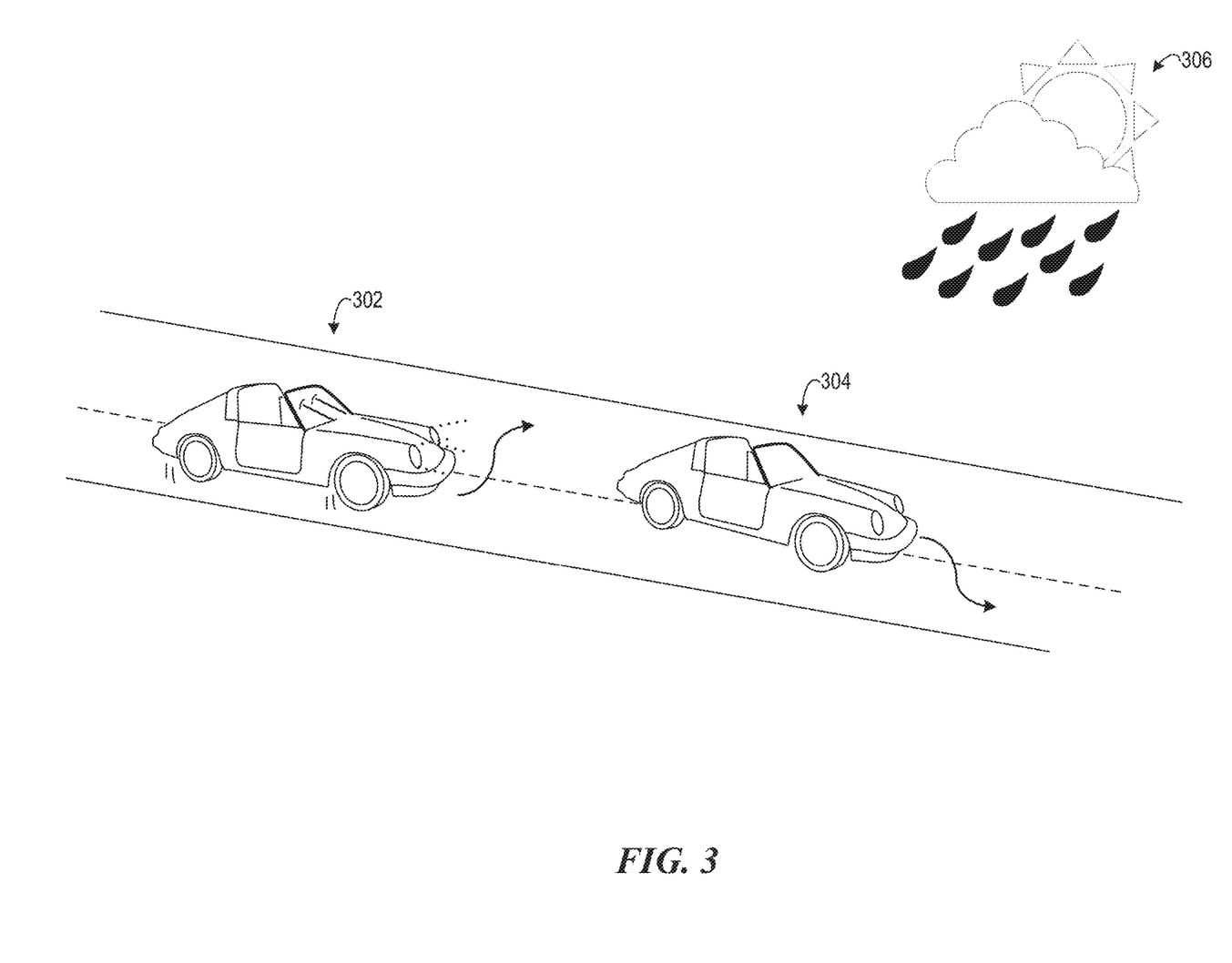
FIG. 3 depicts examples of vehicular operations performed by a vehicle responsive to commands issued by a handheld mobile device implementing the app-based integration of locally and/or remotely sourced vehicular-related information.

For example, FIG. 3 depicts a scenario in which the app 208 can provide semi-autonomous or autonomous vehicular operations in response to current driving conditions. As shown, vehicle 302 is driven on a road behind vehicle 304. The app-based integration of vehicular-related information and a vehicle's on-board computer(s) enable the vehicle 302 to estimate existing or oncoming inclement weather 306 and respond accordingly by, for example, turning on the vehicle 302's windshield wipers or headlights, cause the vehicle to reduce its speed, etc. In another example, the app can cause the vehicle 302 to steer in a direction that avoids a collision with the vehicle 304 that cut off the vehicle 302. The app can cause the vehicle 302 to take these actions by controlling existing subsystems via a data link connector. For example, the app can interact with the steering function of a self-parking subsystem of the vehicle 302 to cause the vehicle 302 to steer in a direction that avoids a collision with the vehicle 304. In this way, an existing vehicle may be provided with additional feature of driver assist and autonomous operation.

Processes for Vehicular Operations

Figure 4:
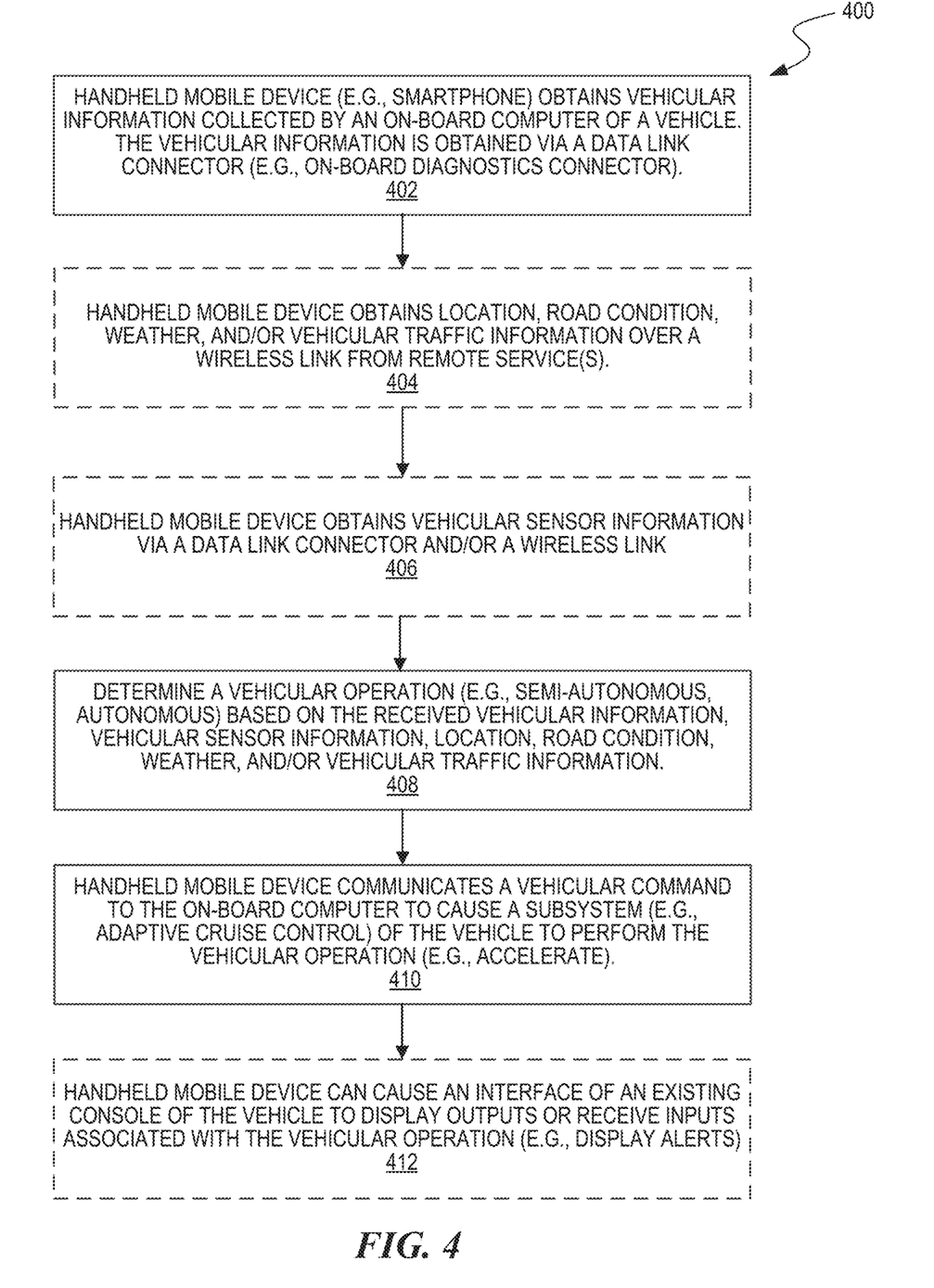
FIG. 4 is a flow diagram of a process performed by a handheld mobile device to cause a vehicular operation associated with an existing capability of a vehicle.

FIG. 4 is a flow diagram of a process 400 performed by an HMD to cause a vehicular operation associated with an existing capability of a vehicle. In step 402, the HMD (e.g., smartphone) obtains vehicular information collected by an on-board computer of the vehicle. The vehicular information can be obtained via an existing data link connector of the vehicle. An example of such a connector is an on-board diagnostics (OBD) connector. In some embodiments, the HMD can perform bi-directional communications between the HMD and the on-board computer via the data link connector. Moreover, in some embodiments, the HMD can be powered from a power source of the vehicle via the data link connector.

In step 404, the HMD optionally obtains information related to environmental or driving conditions from one or more remote services. The information can be received over a wireless link such as a cellular link, a Wi-Fi link, or a short-range radio link (e.g., BLUETOOTH). Examples of the obtained information include location information, road condition information, weather information, and/or vehicular traffic information.

In step 406, the HMD optionally obtains vehicular sensor information of the vehicle. For example, the vehicle may include sensors that detect environmental, mechanical, or electrical conditions. In some embodiments, the vehicular sensor information is obtained over a wireless link or via the data link connector.

In step 408, a vehicular operation is determined based on any of the obtained vehicular information, the obtained vehicular sensor information, and/or the received location information, road condition information, weather information, or vehicular traffic information. In some embodiments, the HMD can perform the determination or a remote service can perform the determination and communicate the resulting vehicular determination to the HMD. In one example, the vehicular operation is a semi-autonomous driving operation configured to assist a human driver of the vehicle to navigate the vehicle. In another example, the vehicular operation is an autonomous driving operation causing the vehicle to perform a driving operation independent of any human driver of the vehicle.

In step 410, the HMD communicates a vehicular command to an on-board computer to cause a subsystem of the vehicle to perform the vehicular operation. In some embodiments, the vehicular operation is activating or deactivating a feature (e.g., windshield wipers, headlights) of an existing capability of a subsystem. For example, the vehicular operation may be a notification configured to assist a human driver with navigation of the vehicle, The notification can be rendered by an output device of the vehicle or an output device of the HMD.

In some embodiments, the vehicular operation is a modification to an operation of an existing capability of a subsystem. Examples of typical subsystems include a powertrain subsystem, a braking subsystem, a steering subsystem, an electronics subsystem, or a control subsystem. Specific examples of subsystems that have modifiable drive assist features include an adaptive cruise control subsystem, a parking assistance with automated steering subsystem, or a lane keeping assistance subsystem.

In step 412, the HMD device can optionally cause an interface of an existing console of the vehicle to display outputs or receive inputs associated with the vehicular operation (e.g., display alerts). In some embodiments, the HMD is operable to receive input from a human driver of a vehicle to control setting of the vehicular operation. For example, a human driver can input a setting on the vehicle's console for responding to a particular road conditions. The settings can be communicated to the HMD, which could consider those settings when determining an appropriate vehicular command in response to detecting the particular road condition.

Figure 5:
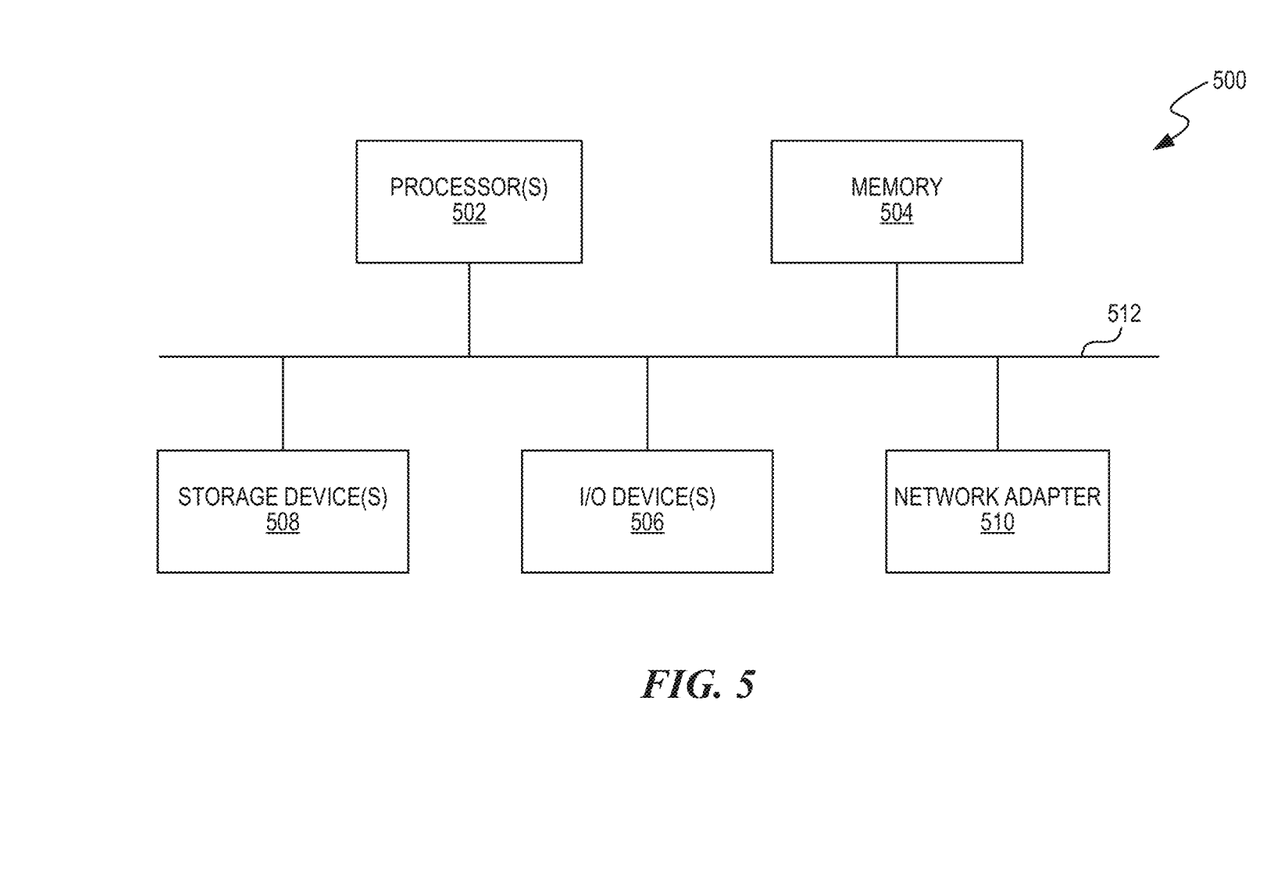
FIG. 5 is a block diagram illustrating a diagrammatic representation of a machine in the example form of a computer system operable to perform aspects of the disclosed technology.

FIG. 5 is a block diagram of a computer system that may be used to implement features of some of the disclosed technology. The computing system 500 may be an HMD, vehicle console, on-board computer, sensor, a server computer, a client computer, a personal computer (PC), a user device, a tablet PC, a laptop computer, a personal digital assistant (PDA), a cellular telephone, an IPHONE, an IPAD, a BLACKBERRY, a processor, a telephone, a web appliance, a network router, switch or bridge, a console, a handheld console, a (handheld) gaming device, a music player, any portable, mobile, handheld device, wearable device, or any machine capable of executing a set of instructions, sequential or otherwise, that specify actions to be taken by that machine.

The computing system 500 may include one or more central processing units ("processors") 502, memory 504, input/output devices 506 (e.g., keyboard and pointing devices, touch devices, display devices), storage devices 508 (e.g., disk drives), and network adapters 510 (e.g., network interfaces) that are each connected to an interconnect 512. The interconnect 512 is illustrated as an abstraction that represents any one or more separate physical buses, point to point connections, or both connected by appropriate bridges, adapters, or controllers. The interconnect 512, therefore, may include, for example, a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus (i.e., FIREWIRE).

The memory 504 and storage devices 508 can be non-transitory computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer readable storage media (e.g. non-transitory media) and computer readable transmission media.

The instructions stored in memory 504 can be implemented as software and/or firmware to program the processor 502 to carry out actions described above. In some embodiments, such software or firmware may be initially provided to the computing system 500 by downloading it from a remote system through the computing system 500 (e.g., via network adapter 510).

The various embodiments introduced herein can be implemented by, for example, programmable circuitry (e.g. one or more microprocessors, programmed with software and/or firmware), or entirely in special-purpose hardwired circuitry (i.e., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A handheld mobile device (HMD) operable to cause a subsystem of a vehicle to perform a vehicular operation associated with an existing capability of the subsystem, the HMD comprising:
   a processor;
   a port operable to communicatively couple the HMD to an existing on-board computer of a vehicle via an existing data link connector of the vehicle;
   a wireless interface operable to communicatively couple the HMD to at least one of the vehicle or a remote service; and
   a memory storing a software application including instructions that, when executed by the processor, causes the HMD to:
      obtain sensor information indicative of a location of the vehicle or an object moving relative to the vehicle;
      generate a vehicular command based on the obtained sensor information; and
      communicate the vehicular command to the on-board computer via the existing data link connector to perform the vehicular operation associated with the existing capability of the subsystem, the vehicular operation including at least a semi-autonomous driving operation configured to assist a human driver of the vehicle to navigate the vehicle.

2. The device of claim 1, wherein the vehicular operation includes an autonomous driving operation causing the vehicle to perform a driving operation independent of any human driver of the vehicle.

3. The device of claim 1, wherein the vehicular operation includes activating or deactivating a feature of the existing capability of the subsystem.

4. The device of claim 1, wherein the vehicular operation includes a modification to an operation of the existing capability of the subsystem.

5. The device of claim 1, wherein the subsystem includes any of a powertrain subsystem, a braking subsystem, a steering subsystem, an electronics subsystem, or a control subsystem.

6. The device of claim 1, wherein the vehicular operation includes a modified operation of an adaptive cruise control subsystem, a parking assistance with automated steering subsystem, or a lane keeping assistance subsystem.

7. The device of claim 1, wherein the port enables bi-directional communications between the HMD and the on-board computer via the data link connector.

8. The device of claim 1, wherein the executed instructions cause the HMD device to obtain vehicular information of the vehicle via the existing data link connector such that the vehicular command is based on the obtained vehicular information.

9. The device of claim 1, wherein the executed instructions cause the HMD device to obtain vehicular sensor information generated by a sensor of the vehicle such that the vehicular command is based on the obtained vehicular sensor information.

10. The device of claim 1, wherein the executed instructions cause the HMD device to obtain at least one of location information, road condition information, weather information, or vehicular traffic information from one or more remote service providers such that the vehicular command is based on the obtained location information, road condition information, weather information, or vehicular traffic.

11. The device of claim 1, wherein the executed instructions cause the HMD device to cause an interface of an existing console of the vehicle to display outputs or receive inputs associated with the vehicular operation.

12. The device of claim 1, wherein the data link connector is an existing on-board diagnostics connector of the vehicle.

13. The device of claim 1, wherein the wireless interface is operable to communicatively couple the HMD to the remote service or to the vehicle over at least one of a cellular link, a Wi-Fi link, or a short-range radio link.

14. The device of claim 1, wherein the port is operable to receive power from a power source of the vehicle via the data link connector.

15. The device of claim 1, wherein the vehicular operation includes a notification configured to assist a human driver with navigation of the vehicle, the notification being rendered by an output device of the vehicle or an output device of the HMD.

16. The device of claim 1, wherein the HMD is a smartphone.

17. The device of claim 1, wherein the HMD is operable to receive input from a human driver of a vehicle to control setting of the vehicular operation.

18. A system operable to cause a subsystem of a vehicle to perform a vehicular operation associated with an existing capability of the subsystem, the system comprising:
- a smartphone including:
  - a processor;
  - a memory;
  - a port operable to perform bi-directional communications of vehicular information by coupling the smartphone to an on-board diagnostics (OBD) connector; and
  - a wireless interface operable to receive at least one of location information, road condition information, weather information, or vehicular traffic information from one or more remote services; and
- a software application stored on the memory that, when executed by the processor, causes the smartphone to:
  - obtain sensor information indicative of a location of the vehicle or an object moving relative to the vehicle,
  - determine a vehicular operation based on vehicular information received via the OBD connector, the sensor information, and any of location information, road condition information, weather information, or vehicular traffic information received via the wireless interface; and
  - communicate the vehicular command to an on-board computer of the vehicle via the OBD connector to perform the vehicular operation by modifying an operation of an existing capability of an adaptive cruise control subsystem, a parking assistance with automated steering subsystem, or a lane keeping assistance subsystem, the vehicular operation including at least a semi-autonomous driving operation configured to assist a human driver of the vehicle to navigate the vehicle.

19. A method performed by a smartphone to cause a vehicular operation associated with an existing capability of a vehicle, the method comprising:
- receiving, via an on-board diagnostics (OBD) connector, vehicular information collected by an on-board computer of the vehicle;
- receiving, over a wireless link, at least one of location information, road condition information, weather information, or vehicular traffic information;
- receiving sensor information indicative of a location of the vehicle or an object moving relative to the vehicle;
- determining a vehicular operation based on the received vehicular information, the sensor information, and the received location information, road condition information, weather information, or vehicular traffic information; and
- communicating, via the OBD connector, a vehicular command to the on-board computer to perform the vehicular operation by modifying an operation of an existing capability of an adaptive cruise control subsystem, a parking assistance with automated steering subsystem, or a lane keeping assistance subsystem, the vehicular operation including at least a semi-autonomous driving operation configured to assist a human driver of the vehicle to navigate the vehicle.

* * * * *